Figure 1:
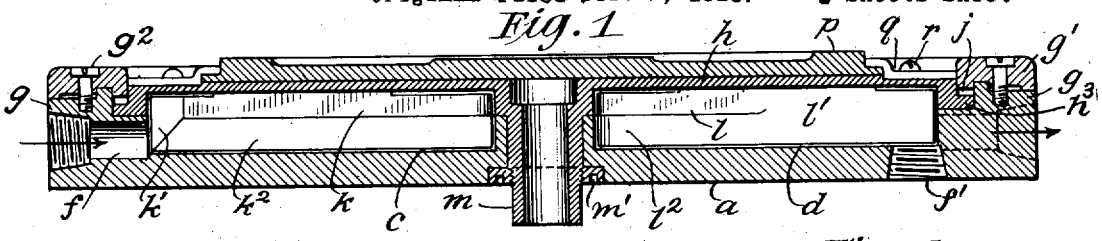

May 22, 1923. Re. 15,608

C. F. BURROUGHS

HEATING OR COOLING PLATE FOR MOLDING PRESSES

Original Filed Feb. 7, 1918. 3 Sheets-Sheet 1

Inventor
Charles F. Burroughs by his attorney H. Laird Goldsborough

May 22, 1923. Re. 15,608

C. F. BURROUGHS

HEATING OR COOLING PLATE FOR MOLDING PRESSES

Original Filed Feb. 7, 1918 3 Sheets-Sheet 2

Inventor
Charles F. Burroughs by his Attorney N. Laird Goldsborough

May 22, 1923. Re. 15,608

C. F. BURROUGHS

HEATING OR COOLING PLATE FOR MOLDING PRESSES

Original Filed Feb. 7, 1918 3 Sheets-Sheet 3

INVENTOR
*Charles F. Burroughs*
BY
*Roy B. Whitman*
ATTORNEY

Reissued May 22, 1923. Re. 15,608

UNITED STATES PATENT OFFICE.

CHARLES F. BURROUGHS, OF EAST ORANGE, NEW JERSEY, ASSIGNOR, BY MESNE ASSIGNMENTS, TO THE COLUMBIA GRAPHOPHONE MANUFACTURING COMPANY, OF BRIDGEPORT, CONNECTICUT, A CORPORATION OF DELAWARE.

HEATING OR COOLING PLATE FOR MOLDING PRESSES.

Original No. 1,296,916, dated March 11, 1919, Serial No. 215,821, filed February 7, 1918. Application for reissue filed December 13, 1919. Serial No. 344,711.

*To all whom it may concern:*

Be it known that I, CHARLES F. BURROUGHS, a citizen of the United States, residing at 122 Prospect Street, East Orange, county of Essex, and State of New Jersey, have invented certain new and useful Improvements in Heating or Cooling Plates for Molding Presses, fully described and represented in the following specification and the accompanying drawings, forming a part of the same.

The object of the present invention is to furnish a heating or cooling-plate which may be employed in presses or upon work-benches to heat a mold, or other object, seated upon the said plate.

This heating or cooling-plate comprises a base having a flat top to which is fitted a top-seat having numerous interior channels in which the heating or cooling fluid is circulated in a novel manner, so as to secure a very free movement of the fluid through the channels in both directions from the fluid-inlet to an outlet, which mode of circulation heats the seat on top of the cooling-plate uniformly, as well as quickly.

Such top-portion of the cooling-plate is preferably made thin so as to readily transmit heat to or from the mold or other article supported thereon; and the pressure to which such a plate is sometimes subjected, which amounts to many tons in hydraulic molding operations is, in this construction, sustained by forming the circulating channels by ribs upon the under side of such top-portion, which ribs rest directly upon the base so as to transmit the load thereto.

The heating or cooling-plate is shown of circular form herein, which is adapted for heating the circular mold used in molding phonographic records, and the circulating channels are shown curved concentrically about the center of the plate; but the plate may be square or rectangular, and the same effects produced by making the channels parallel with the rectangular sides of the plate.

The essential feature of the invention is the distribution of the heating or cooling fluid from an inlet through channels in opposite halves of the plate simultaneously so that the two halves may be equally affected; and furthermore, the restriction of the circulation through those passages which may be shorter than others, so as to permit longer passages to be heated to the same degree as the shorter ones.

The invention may be practiced with any construction that carries out this mode of distribution.

The underside of the base is ribbed so as to greatly reduce the area of contact with the bed or platen of the press on which it is supported, and thus avoid in great degree the transmission of heat to such bed or platen.

In a circular plate, the circulating channels are curved about the center of the cooling-plate and communicate at opposite sides of the center with radial pockets in the top of the base, the outer ends of which are provided respectively with an inlet and outlet.

The fluid entering the inlet-pocket has access at both sides to the channels, and the heating or cooling fluid thus moves in both directions from the inlet through the channels to the outlet-pocket.

To insure an equal distribution of the fluid from the inlet-pocket into all the channels, from both sides of the pocket, a partition is preferably provided to intersect the channels at the middle line of the pocket and the partition extended downward into the pocket so that the fluid entering the inlet-pocket is divided by the partition and flows equally into the channels from both sides of the pocket. A somewhat similar partition intersects the channels over the outlet-pocket, thus forcing the fluid entering both sides of the pocket to flow toward its outer end, which is provided with the outlet.

Figure 3:
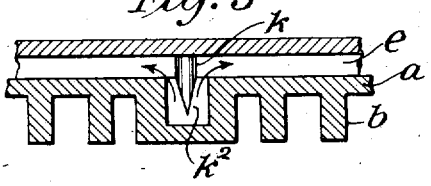
Figure 4:
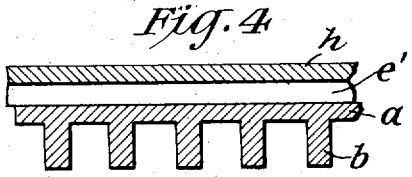
Figure 2:
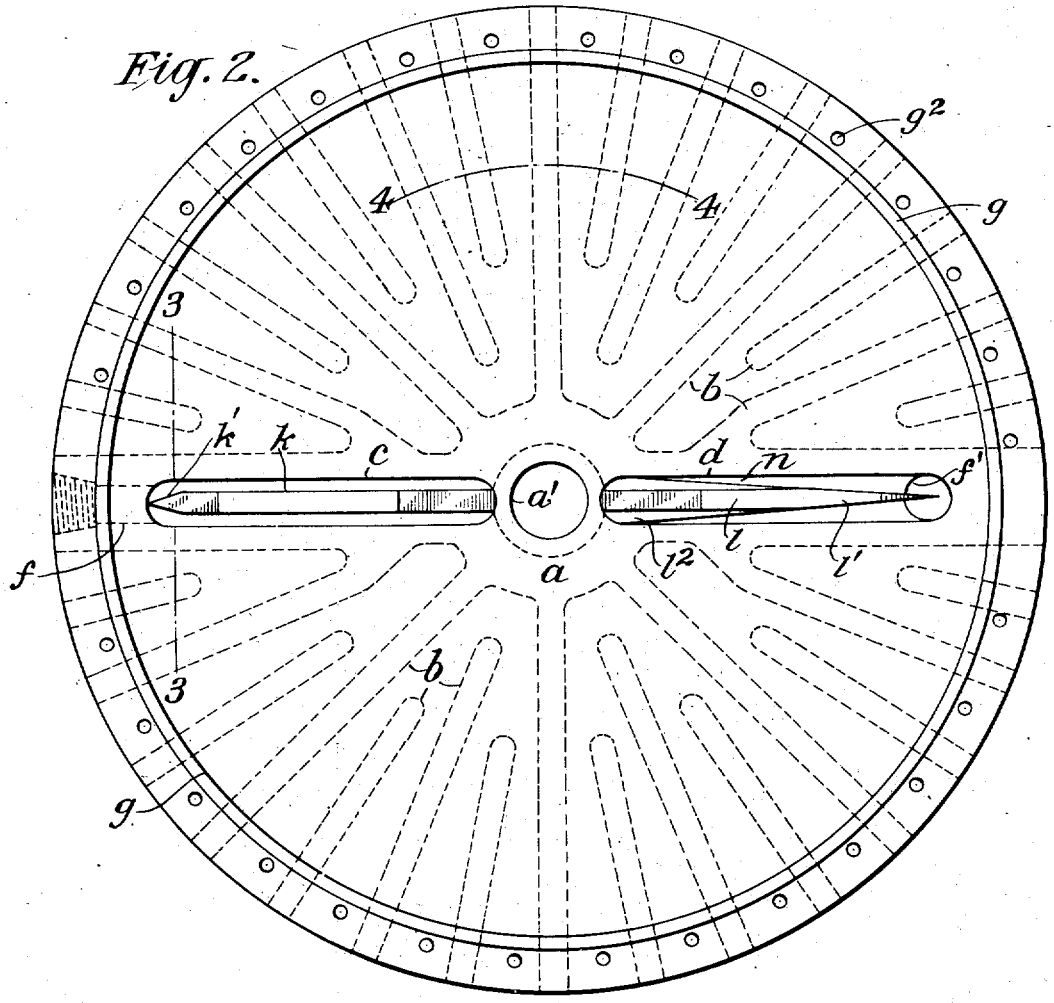
Figure 5:
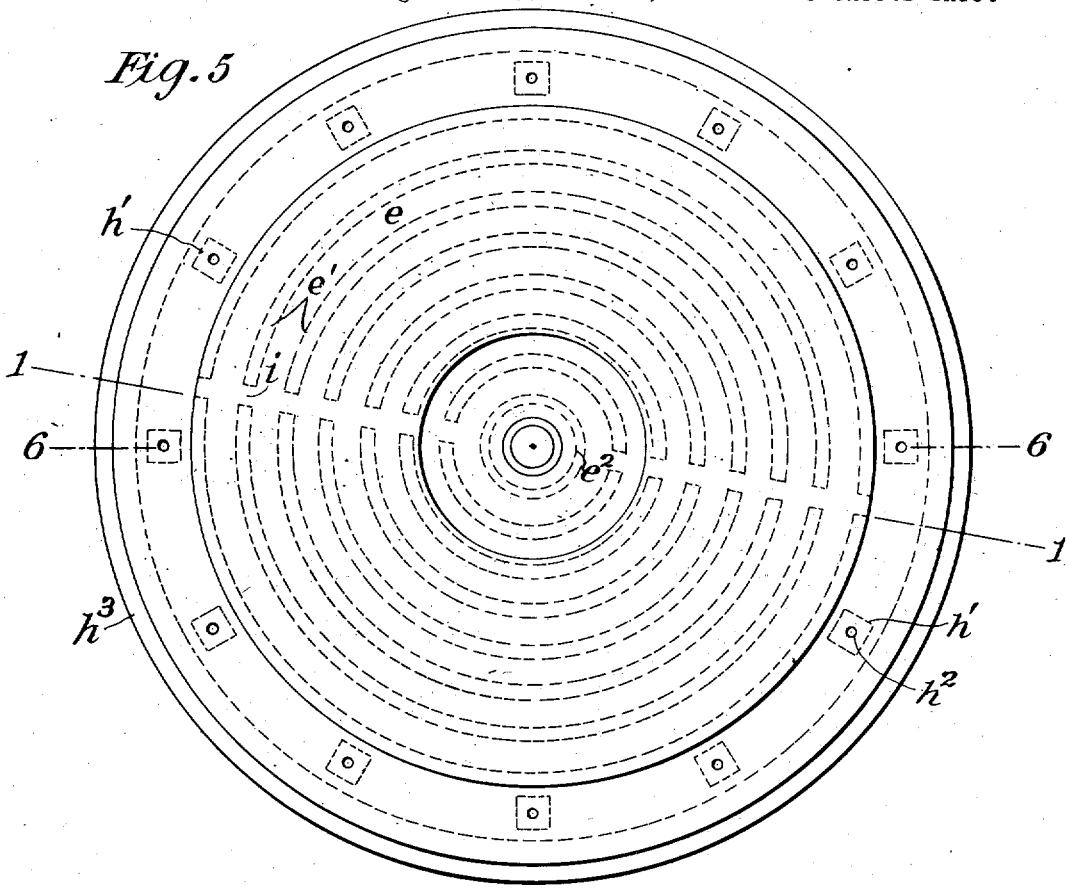
Figure 6:
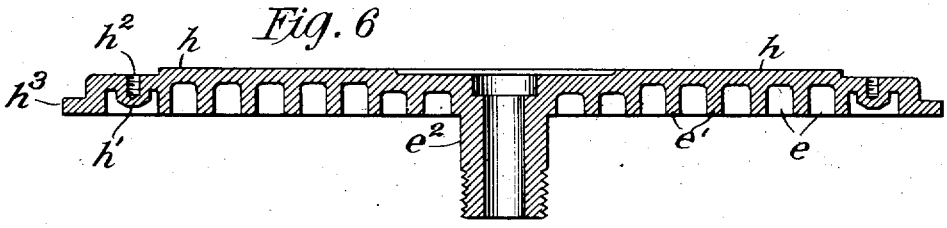
Figure 7:
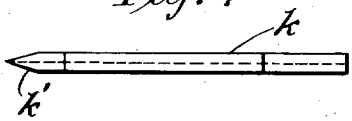
Figure 8:
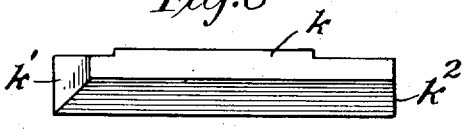

The invention will be understood by reference to the annexed drawing, in which Figure 1 is a cross section of the entire heating and cooling-plate, taken on line 1—1 in Fig. 5, with a record-mold attached thereto; Fig. 2 shows the upper side of the base; Fig. 3 is a cross section of a portion of the base and top-seat taken across one of the pockets on line 3—3 in Fig. 2; Fig. 4 is a portion of the base and top-seat taken on line 4—4 in Fig. 2; Fig. 5 shows the upper side of the top-seat; Fig. 6 is a section of the top-seat on line 6—6 in Fig. 5; Fig. 7 is a top view, and Fig. 8 a side view of the partition for the inlet-pocket.

Figure 9:
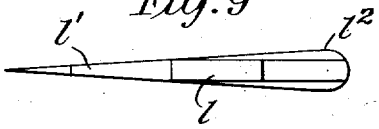
Figure 10:
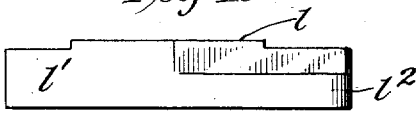

Fig. 9 is a top view, and Fig. 10 a side view of the partition for the outlet-pocket.

Figure 11:
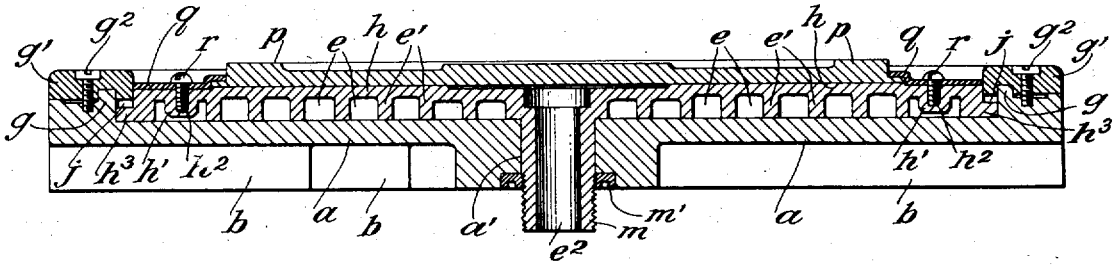
Figure 12:
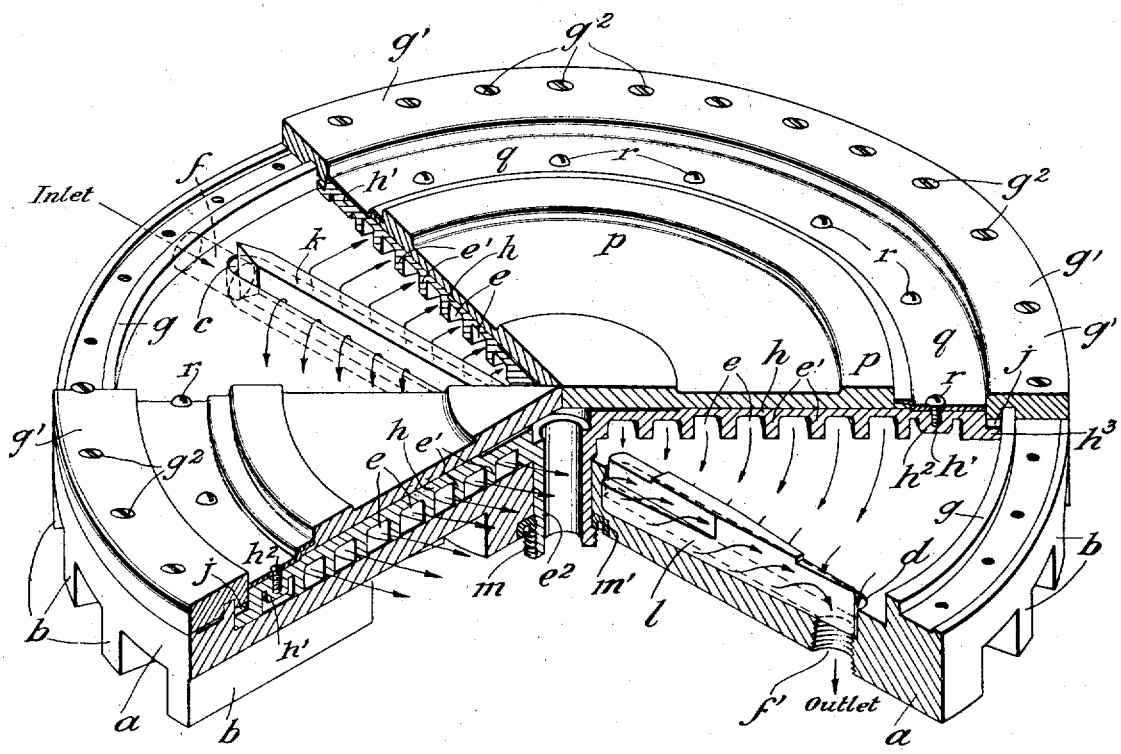

Fig. 11 is a cross-section of the entire heating and cooling plate, with the various parts in proper assembled relation, this cross-sectional view being taken along a diametral line between the integral ribs "*b*" of base "*a*" (Fig. 2); and Fig. 12 is an incomplete perspective view from above, and including several incomplete cut-out sections, of the plate structure, with all parts in proper assembled relation; this view showing clearly the position of inlet and outlet, the means of diverting the supplied media to the plurality of channels, and other means of again diverting the media, proportionately to the length of the channels, through the outlet.

The base "*a*", as shown in Figs. 3 and 4, is formed of a thin disk with integral ribs "*b*" upon its under side to rest upon the bed-plate or platen.

Radial pockets "*c*" and "*d*" are formed in the upper side of the base, the outer end of the inlet-pocket being connected with an inlet "*f*" and the outer end of the outlet-pocket connected with an outlet "*f*". The margin of the base is provided with an upwardly projecting ring "*g*" to center the top-seat thereon. The said seat is shown with the top-portion "*h*" of the body made relatively this, and a series of concentric channels "*e*" formed upon its under side by concentric ribs "*e'*" which are fitted to rest upon the base "*a*".

Radial notches "*i*" are shown in the ribs at opposite sides of the center (upon the line 1—1 in Fig. 5); and flat partitions are fitted to such notches to wholly cut off any connection between the channels at one side and the other of the diametrical line 1—1. The partitions project downward respectively into the pockets "*c*" and "*d*", the partition for the inlet-pocket "*c*" having a parallel body "*k*" fitted to the notches "*i*", and a short tapered end "*k'*" projected toward the inlet "*f*", and the lower portion "$k^2$" wedge-shaped, as shown in Fig. 3, where it projects downward into the pocket.

The pocket is made wider than the thickness of the wedge, to afford clearance at its opposite sides for the fluid to pass into the adjacent ends of the channels, as is indicated by the arrows in Fig. 3 at opposite sides of the partition. The wedge-shape of the partition facilitates the passage of the fluid from the inlet to the whole length of the pocket.

The partition for the outlet-pocket "*d*" has a parallel portion "*l*" extended about one-half its length which is fitted to the notches "*i*" next the center of the plate, and the partition is wholly tapered therefrom in a thin wedge "*l'*" to the outer end of the pocket, which coincides with the outlet-aperture "*f'*".

Where this partition extends downward into the pocket "*d*", it is formed with a widened butt "$l^2$" which fills the pocket adjacent to the inner or central channels "*e*", and is tapered to the sides of the body-portion "*l*". It thus restricts the flow from the inner channels which is only effected in the narrow wedge-shaped space "*n*" at the sides of such butt.

The tendency of an elastic fluid like steam, when admitted to these concentric channels, would be to take the shortest path through the channels next the center of the plate, so that the center of the plate would be heated much more quickly and effectively than the outer portion.

The restrictions of the outlet from these central channels to the pocket "*d*" prevent a rapid flow of fluid through these inner channels and causes an equal distribution of the fluid to the outer channels, thus securing a uniform temperature of the whole plate.

It is obvious that if the notches "*i*" of the ribs "*e'*" were disposed over the pockets "*c*", "*d*", the fluid when introduced to the inlet-pocket "*c*" would pass from both edges of the same into the channels at both sides of the pocket and would thus reach the outlet-pocket "*d*"; but without any control as to its velocity or its distribution in the inner and outer channels which is effected by the use of the partitions.

By making the top seat of a casting, integral partitions could be cast in the proper position upon the ribs to project into the pockets "*c*", "*d*". Such projecting parts would, however, interfere with the facing-off of the ribbed surface of the top-seat, which is necessary to give it an equable bearing upon the top of the base "*a*", and the use of loose partitions thus facilitates the proper finishing of the parts.

The formation of the top-seat separate from the base is obviously necessary to introduce the partitions to the pockets, and the marginal ring "*g*" serves to center the top-seat upon the base and also to receive an annular clamp "*g'*" which is provided upon the ring "*g*" to press the margin of the top-seat closely upon the base.

A flange "$h^3$" is formed upon the margin of the top-seat, and the annular clamp is constructed to overlap the flange "$h^3$", and is enabled to form a steam-tight joint between the flange and the base by pressing upon a collar of yielding packing "*j*" between the flange and the under surface of the clamp. The clamp is secured to the ring "*g*" by numerous screws "$g^2$" which are adapted to resist the pressure of the steam employed in such plates when used for heating purposes; and these screws are arranged to compress the packing "j" and spread the same to form a tight joint with the adjacent surfaces. The top-seat is also preferably secured to the base by a center stud "m" extended through a hole "a'" in the base and secured beneath the same by a nut "m'".

The inlet or outlet to either of the pockets may obviously be extended through the edge of the plate, as shown at "f" in Fig. 1, or to the bottom of the plate, as shown at "f'".

The disk-mold "p" is shown in Fig. 1 clamped detachably upon the upper surface of the top-seat by gibs "q" and screws "r", which illustrates the securing of such mold-parts to the plate to be heated and cooled thereby in a press.

Figs. 5 and 6 show bosses "h'" upon the inner side of the top-portion "h" to receive the holes "$h^2$" for the screws "r" of the gibs "q", thus securing lightness in this part of the structure.

From the above construction it will be seen that my invention provides means, in a very simple construction which is readily made of castings, by which steam entering an inlet at the edge of the plate is distributed positively into opposite halves of the plate so as to heat them simultaneously and equally; and also prevents steam from passing through shorter channels more freely than through the longer channels.

The effect of the whole construction is to secure rapidity of uniform heating over the entire surface of the plate, and facilitating also the alternate heating and cooling of the plate when required.

In the manufacture of articles from plastic materials, especially in the manufacture of sound records, it is important that the matrices or dies be uniformly heated and cooled throughout their effective surfaces otherwise defective spots will appear upon the finished articles. From the foregoing description, therefore, it will be understood that my invention, broadly speaking, embraces a novel apparatus and process of heating and cooling an impression producing surface secured to a suitable backing; the process consisting in passing a heating or a cooling medium through a plurality of paths arranged in close proximity to said impression producing surface, and varying the flow of said medium through said paths in proportion to the area of said surface to be heated and cooled thereby. Or in other words it may be stated that the quantity of fluid passed through the passages in the backing is not only a function of the volume of said passages but also a function of the area of the impression producing surface to be heated or cooled by the fluid passing through said paths.

Having thus set forth the nature of the invention, what is claimed herein is:

1. In a plate for heating or cooling, the combination, with a base having a radial pocket in its upper side disposed as set forth, of a top-seat united to the base and having ribs forming channels encircling the center of said seat and intersected radially by a partition extended downward into the pocket in the base, with clearance in the pockets at opposite sides of the partition, connecting with the said channels, an inlet supplying a heating or cooling fluid to the said pocket at one edge of the base, and an outlet from the opposite side of the base, whereby fluid is distributed laterally in the said channels in both directions from the said pocket to reach the said outlet.

2. In a plate for heating or cooling, the combination, with a base having a flat top with opposite radial pockets therein, of a top-seat united to the base and provided next the base with a plurality of circular channels, an inlet and outlet in the base connected respectively to the outer ends of the said pockets, the fluid in the inlet-pocket being thus admitted from both sides of the inlet-pocket into the channels between the ribs, to reach the outlet connected with the opposite outlet-pocket.

3. In a plate for heating or cooling, the combination, with a base having opposite radial pockets in its upper side, of a top-seat united to the base and provided next the base with a plurality of circular channels with opposite radial partitions intersecting the said channels and projected downward into the pockets for the purpose set forth.

4. In a plate for heating or cooling, the combination, with a base having opposite radial pockets in its upper side, of a top-seat united to the base and having a plurality of concentric ribs forming channels curving about the center of said seat and intersected radially by opposite partitions extended downward into the said pockets, an inlet supplying a heating or cooling fluid to the outer end of one of the said pockets, and an outlet from the outer end of the opposite pocket.

5. In a plate for heating or cooling, the combination, with a base having a flat top with opposite radial pockets therein and an inlet and outlet in the base connected respectively to the outer ends of the said pockets, of a top-seat united to the base and having a plurality of concentric ribs and channels supported upon the top of the base, and partitions radially intersecting said ribs and extended downward into the said pockets, with clearance in the pockets, at opposite sides of the partitions connecting with the channels between the said ribs.

6. In a plate for heating or cooling, the combination, with a base having a flat top with opposite radial pockets therein and an inlet and outlet in the base connected respectively to the outer ends of the said pockets, of a top-seat united to the base and having a plurality of concentric ribs and channels supported upon the top of the base, and partitions radially intersecting said ribs and extended downward into the said pockets with clearance in the pockets at opposite sides of the partitions connecting with the channels between the said ribs, the end of the partition next the inlet having a short taper to equally divide the fluid entering the inlet-pocket, and the end of the partition next the outlet having a long taper to proportion the access of the escaping fluid to the outlet-pocket, and direct it to the outlet-opening.

7. In a plate for heating or cooling, the combination, with a base having a flat top with a ring at the margin and opposite radial pockets in its upper surface with inlet and outlet connected respectively to their outer ends, of a top-seat fitted within the said ring and having a series of annular ribs upon its under side resting upon the said base, and radial partitions intersecting the said ribs and the channels between the same, and projecting into the said pockets with clearance in the pockets at opposite sides of the partitions connecting with the channels between the said ribs, and the top-seat being secured to the base, at its center and margin to form a tight-joint with the said pockets.

8. In a plate for heating or cooling, the combination, with a base having a flat top with opposite radial pockets therein and an inlet and outlet in the base connected respectively to the outer ends of the said pockets, of a top-seat united to the base and having a plurality of concentric ribs and channels supported upon the top of the base, and partitions radially intersecting said ribs and extended downward into the said pockets, the partition in the outlet pocket having its butt widened at the inner end to obstruct the flow from the central channels, and its outer end greatly reduced by taper to increase or facilitate the discharge from the outer channels.

9. The process of heating and cooling a flat die for handling hot phonograph record material which consists in forming a plurality of circularly arranged channels close to each other and to the die surface for the passage of fluid and supplying each of the fluids thereto concurrently.

10. The process of heating and cooling dies for the manufacture of phonograph records from hot plastic material, which consists in supplying heating and cooling fluids alternately and concurrently to a plurality of uniformly-spaced circularly-arranged passages near the surface of said die, and regulating the amount of fluid admitted to each passage in proportion to its length.

11. A phonograph die for pressing hot plastic material comprising a die body and channel disk interfitting therewith provided with a plurality of annular channels in one of the parts on their facing side and inlet and outlet fluid supply and discharge provision connecting with all of the channels.

12. In a phonograph die, a die body and channel disk interfitting therewith, one of the parts being annularly channeled concentrically and the other providing inlet and outlet passages both connecting therewith at different distances from the center.

13. In a phonograph die, a die body and channel disk interfitting therewith, one of the parts being annularly channeled and the other providing channel outlets of variant size.

14. A disk die for pressing hot plastic material divided into two parts along a plane parallel to the face of the die having circularly spaced channels formed in the facing side of one of said parts, separate inlet and outlet fluid connections for said channels, and a fluid tight seal between the parts.

15. In combination, a die body member, a channeled disk member interfitting therewith, and a fluid tight joint between the members and including a projecting rib in one member fitting a groove in the other, and an additional fluid-closure member confined in said groove.

16. The process of heating or cooling a matrix adapted for the pressing of hot plastic material which consists in passing heating and cooling fluids alternately and in multiple paths through paths in the backing to which the matrix is secured, in quantities proportional to the length of said paths.

17. The process of heating a matrix adapted for pressing hot plastic material which consists in passing a heating fluid through a plurality of paths of variant lengths arranged in close proximity to said matrix the quantity of fluid passed through said paths being a function of their volume.

18. The process of cooling a matrix adapted for pressing hot plastic material which consists in passing a cooling fluid through a plurality of paths of variant lengths arranged in close proximity to said matrix the quantity of fluid passed through said paths being a function of their volume.

19. The process of heating and cooling a matrix adapted for pressing hot plastic material which consists in alternately passing heating and cooling fluids through a plurality of paths of variant lengths arranged in close proximity to said matrix the quantity of said heating and cooling fluids passed through said paths being a function of their volume.

20. The process of heating and cooling a sound record matrix secured to a suitable backing which consists in alternately passing a heating and cooling fluid through paths in said backing of variant lengths arranged in close proximity to said matrix, the quantity of the fluid passed being proportional to the amount of surface to be heated by the fluid passing through said respective paths.

21. The process of heating and cooling an impression producing surface secured to a suitable backing, which consists in alternately passing a heating and cooling medium through a plurality of paths arranged in close proximity to said impression surface, and varying the flow of said medium through said paths in proportion to the area of said surface to be heated and cooled thereby.

22. An apparatus for heating and cooling a matrix comprising a backing to which the matrix is secured provided with a plurality of fluid passages passing therethrough in combination with means for varying the flow of the fluid through said passages in proportion to the area of the matrix to be heated and cooled thereby.

23. The process of heating and cooling a die for hot plastic material which consists in passing heating and cooling fluids alternately and in multiple paths through the die close to the surface along well defined lines of flow of relatively small cross section at substantially uniform distances apart.

24. The process of facilitating heating and cooling of a hot plastic material into disks which consists in supplying the heating and cooling fluids each concurrently through separate paths distributed at substantially uniform distance close to the surface of the material.

25. In combination, a die body, a disk interfitting therewith and provided with channels of different lengths adapted to the flow of a medium, and means for regulating the flow in the channels in proportion to their lengths.

26. In combination, a structure having a surface to be heated, means including a plurality of passages within the structure for flowing a heating medium close to the surface, and means for regulating the flow to the different parts of the surface to uniformly bring said surface to the same degree of heat.

27. In combination, a structure having a surface to be cooled, means including a plurality of passages within the structure for flowing a cooling medium close to the surface, and means for regulating the flow to the different parts of the surface to uniformly bring said surface to the same degree of cold.

28. In combination, a structure having a surface to be heated and cooled, a plurality of paths in the structure, means within the structure for flowing both a heating and a cooling medium alternately and close to the surface through the same plurality of paths, and means for regulating the flow to establish an approximately uniform temperature over the surface.

In witness whereof I affix my signature.

CHARLES F. BURROUGHS.